United States Patent [19]
Drehle

[11] 3,770,986
[45] Nov. 6, 1973

[54] SWITCHING CIRCUIT FOR INDUCTIVE LOADS

[75] Inventor: James R. Drehle, Fort Collins, Colo.

[73] Assignee: Hewlett-Packard Company, Palo Alto, Calif.

[22] Filed: Apr. 20, 1972

[21] Appl. No.: 245,997

[52] U.S. Cl. .................. 307/270, 307/254, 307/255, 307/318, 307/321, 323/75 E

[51] Int. Cl. .............................................. H03k 1/00

[58] Field of Search .................... 307/254, 255, 270, 307/262, 318, 321, 104; 328/208; 323/75 E; 318/138, 439

[56] References Cited

UNITED STATES PATENTS

| | | | |
|---|---|---|---|
| 3,400,304 | 9/1968 | Ziegler | 307/255 X |
| 3,538,353 | 11/1970 | Hanger | 307/255 |
| 3,629,616 | 12/1971 | Walker | 307/254 |
| 3,193,702 | 7/1965 | Claessen | 328/206 X |
| 3,602,739 | 8/1971 | Pattantyus | 307/270 X |

*Primary Examiner*—Stanley D. Miller, Jr.
*Attorney*—Roland I. Griffin

[57] ABSTRACT

An inductive load is connected across a bridge circuit comprising four switching elements.

2 Claims, 4 Drawing Figures

SWITCHING CIRCUIT FOR INDUCTIVE LOADS

BACKGROUND AND SUMMARY OF THE INVENTION

Current flow as a function of time in an inductive load upon application of a step function of voltage of magnitude V is given by the equation $$i(t) = V/R\ (1-e^{-(R/L)t}) + I(0^+)e^{-(R/L)t}$$

where $R$ = inductor resistance
$t$ = time
$L$ = inductance
$I(0^+)$ = initial current This equation describes the wave form A of FIG. 1.

When switching inductive loads such as stepper motors and solenoids it is desirable to obtain a step function of current upon energization rather than a slowly rising current. In order to approach this step function the current in the inductor may be increased faster by momentarily applying a larger voltage step $V_1$, and then removing it when the voltage across the load reaches the operating voltage V. This technique is illustrated by waveform B of FIG. 1. This method has not been easily implemented in the past because of the necessity of providing a high voltage source and switching means to accommodate it. Since the normal operating potential of devices utilizing these circuits is 24 volts, it was necessary to provide voltages of 100 volts or more to significantly decrease the risetime of the current waveform.

Accordingly, it is the principal object of this invention to provide an improved switching circuit for inductive loads that significantly reduces the rise time of load current and that may be implemented by using a second voltage source equal to, greater than, or less than the operating voltage of the load. The second voltage source may, for example, be equal to 5 volts, thus making the switching circuit compatible with off-the-shelf integrated circuits.

It is a further object of this invention to provide an improved switching circuit for inductive loads which is capable of switching multiple loads hving nonsymmetrical current requirements.

These objects are accomplished in accordance with the preferred embodiment of this invention by employing an inductive load connected across a bridge circuit comprising four transistor switches, each of which is provided with a separate bias network and diodes for protecting against excessive forward or reverse voltages. The bridge circuit is provided with a source of D.C. operating potential and a source of ground potential. A pair of the transistors in opposite legs of the bridge is arranged to provide a conduction path through the load to establish an initial current. Thereafter, this path is interrupted and another path provided through the remaining pair of transistors.

DESCRIPTION OF THE PREFERRED EMBODIMENT

Figure 1:
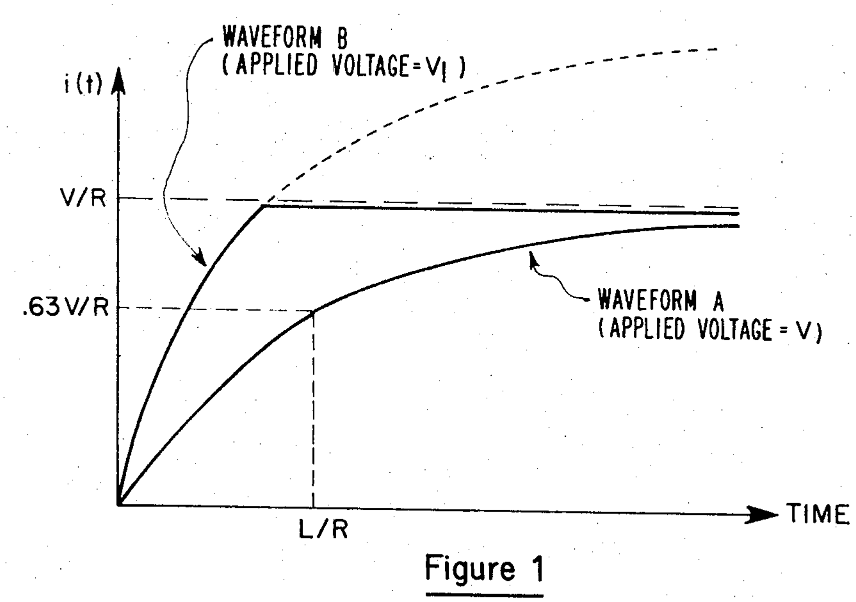
FIG. 1, also referred to above, is a waveform diagram showing the exponential current increase in an inductive load as a function of time when applying a normal operating voltage V and a higher voltage $V_1$.
Figure 2:
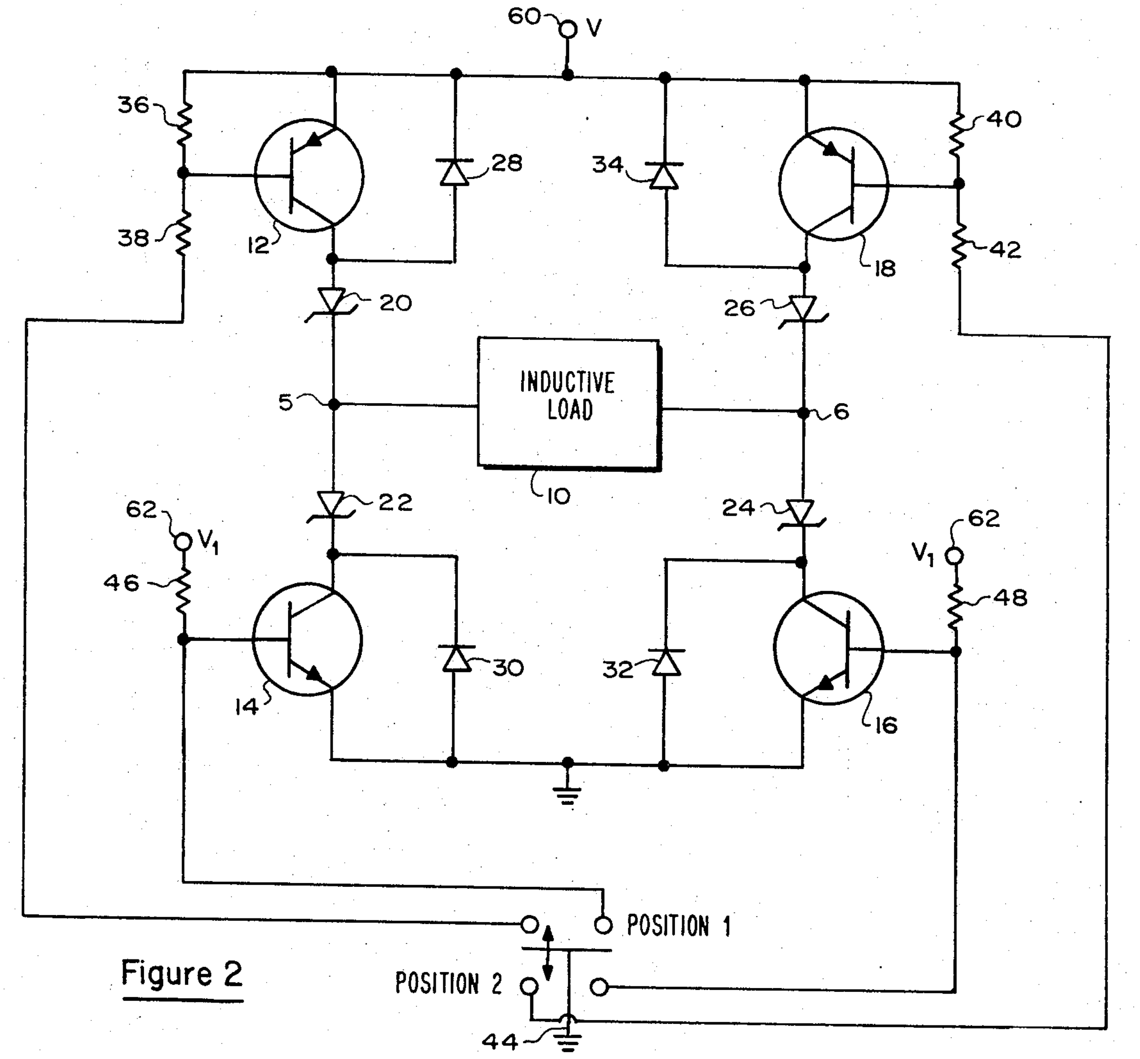
FIG. 2 is a schematic diagram of a circuit which implements the present invention.

Referring to FIG. 2, there is shown an inductive load 10 connected across a bridge circuit comprising transistors 12, 14, 16, 18. The emitters of transistors 12 and 18 are returned to a source of operating voltage 60, and the emitters of transistors 14 and 16 are returned to ground. Diodes 28, 30, 32, 34 are each interposed between the collector and emitter of an associated different one of the transistors for protection against excessive forward voltages. Each of the transistors 12 and 18 has a bias network comprising an associated different pair of resistors 36, 38, 40, 42 connected to their bases and to ground through switch 44. The bases of transistors 14 and 16 are also connected to switch 44 and are supplied by a second voltage source 62 through resistors 46 and 48.

Transistors 12 and 16 conduct when switch 44 is placed in position 1. Resistors 36, 38, 40, 42, 46, 48 are chosen such that transistors 12, 14, 16, 18 are saturated when conducting. When transistors 12 and 16 conduct a voltage $V_2$ is switched across the inductive load to establish a current I therein. The voltage $V_2$ is defined by the equation $$V_2 = V - V_{12}\ (\text{sat}) - V_{20F} - V_{16}(\text{sat}) - V_{24F}$$

where $V$ = operating source voltage 60
$V_{12}$ (sat) = emitter-collector voltage of saturated transistor 12
$V_{20F}$ = forward voltage across zener diode 20
$V_{16}$(sat) = collector-emitter voltage of saturated transistor 16
$V_{24F}$ = forward voltage across zener diode 24

Figure 3:
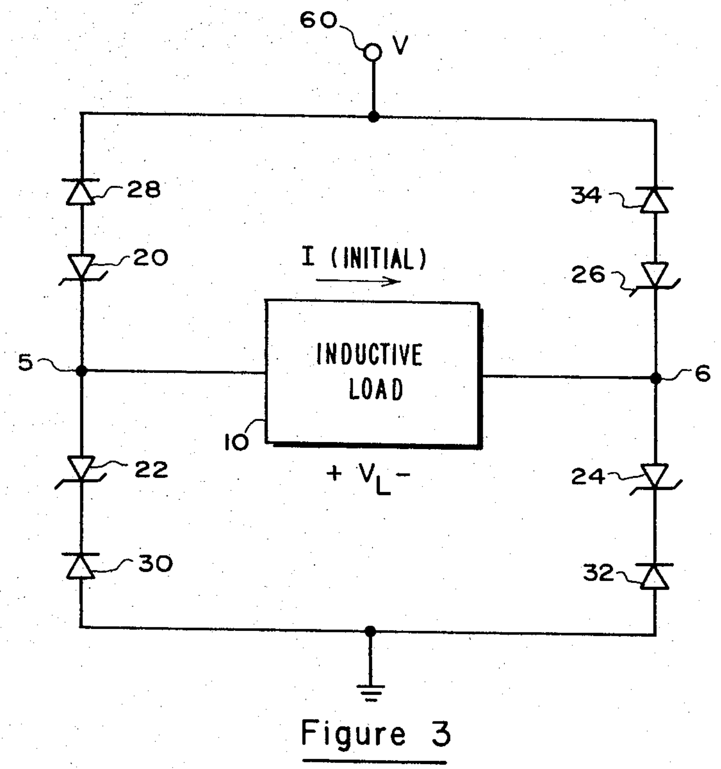
FIG. 3 is an equivalent circuit representation of the circuit of FIG. 2 when switch 44 is in position 2.
Figure 4:
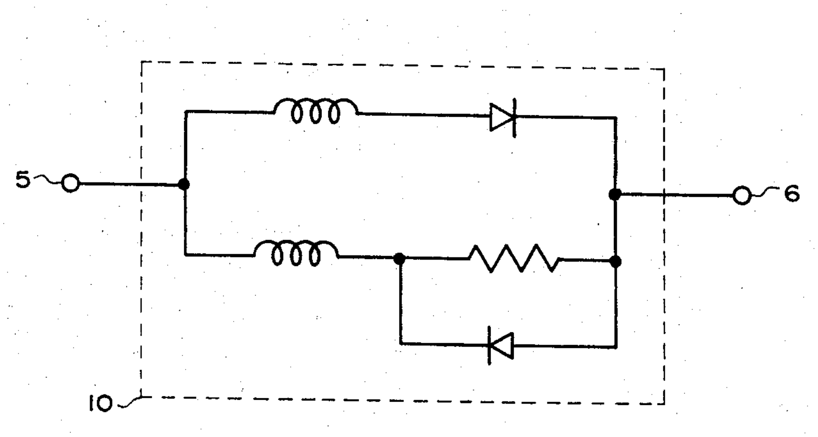
FIG. 4 is an inductive load configuration which might be employed when switching nonsymmetrical load currents.

After establishing the initial current I, switch 44 is placed in position 2, thereby turning off transistor 12 and 16 and turning on the bases of transistors 14 and 18. At this point in time the equivalent circuit seen by inductive load 10 is as shown in FIG. 3. The law of continuity of current in an inductor specifies that the load current $I(0^+)$ immediately after switching must be equal to the initial current I. This current will flow in the path of least resistance which, at node 5, is through diode 30 and zener diode 22 if the reverse breakdown voltage of diode 28 is greater than that of zener diode 22. The voltage at node 5 equals the forward voltage of diode 30 minus the voltage across zener diode 22. At node 6 the path of least resistance is through diode 34 and zener diode 26 if the reverse breakdown voltage of diode 32 is greater than that of zener diode 26. The voltage at node 6 is equal to the operating source voltage plus the forward voltage of diode 34 plus the voltage across zener diode 26. Therefore, all transistors are reverse biased and do not conduct. Under these conditions the total voltage $V_L(0^+)$ across the inductive load immediately after switching is defined by the equation $$V_L(0^+) = -(V_{22Z} + V_{26Z} + V_{30F} + V_{34F} + V)$$

where $V$ = operating source voltage 60
$V_{22Z}$ = reverse voltage across zener diode 22
$V_{26A}$ = reverse voltage across zener diode 26
$V_{30F}$ = forward voltage across diode 30

$V_{34F}$ = forward voltage across diode 34

This voltage $V_L(0^+)$, which can be made quite large by selecting higher voltage zener diodes, is maintained until the initial current is dissipated. Because of the inherent circuit capacitance, $V_L(0^+)$ decays by forcing current through the inductive load in the opposite direction of the initial current until reaching the steady-state value $V_L$(decayed) defined by the equation $$V_L(\text{decayed}) = V_{18}(\text{sat}) + V_{26F} + V_{22F} + V_{14}(\text{sat}) - V$$

where $V$ = operating source voltage 60

$V_{14}$(sat) = collector-emitter voltage of saturated transistor 18

$V_{18}$(sat) = collector-emitter voltage of saturated transistor 18

$V_{22F}$ = forward voltage across zener diode 22

$V_{26F}$ = forward voltage across zener diode 26

When $V_L$ reaches its decayed value transistors 14 and 18 begin conducting, thus completing switching of the current in the inductive load. Switching time is reduced by increasing $V_L(0^+)$ through selection of higher voltage zener diodes and without the necessity of providing a second voltage source of high potential.

I claim:

1. A switching circuit for inductive loads, said switching circuit comprising:

four switching elements arranged in a bridge circuit having a pair of input terminals for connection to a source of operating potential and a pair of output terminals for connection to the inductive load;

four diodes, each connected across a different one of the switching elements; and four zener diodes, each connected between an associated one of the output terminals and an associated different one of the switching elements and the diode connected thereacross.

2. A switching circuit for inductive loads as in claim 1 wherein each of said switching elements comprises a transistor.

* * * * *